W. P. LELAND.
Hay-Rack.

No. 224,451.    Patented Feb. 10, 1880.

Witnesses:
J. W. Garner
W. W. Mortimer

Inventor:
W. P. Leland
per
F. A. Lehmann, atty.

UNITED STATES PATENT OFFICE.

WILLIAM P. LELAND, OF MENDON, MICHIGAN.

HAY-RACK.

SPECIFICATION forming part of Letters Patent No. 224,451, dated February 10, 1880.

Application filed December 22, 1879.

*To all whom it may concern:*

Be it known that I, WILLIAM P. LELAND, of Mendon, in the county of St. Joseph and State of Michigan, have invented certain new and useful Improvements in Hay-Racks; and I do hereby declare the following to be a full, clear, and exact description of the invention, such as will enable others skilled in the art to which it pertains to make and use it, reference being had to the accompanying drawings, which form part of this specification.

My invention relates to an improvement in hay-racks; and it consists in dividing the rack across the center, so as to divide the load into two separate and distinct parts, whereby either half of the load can be raised from the wagon directly into the hay-mow, as will be more fully described hereinafter.

Figure 1:
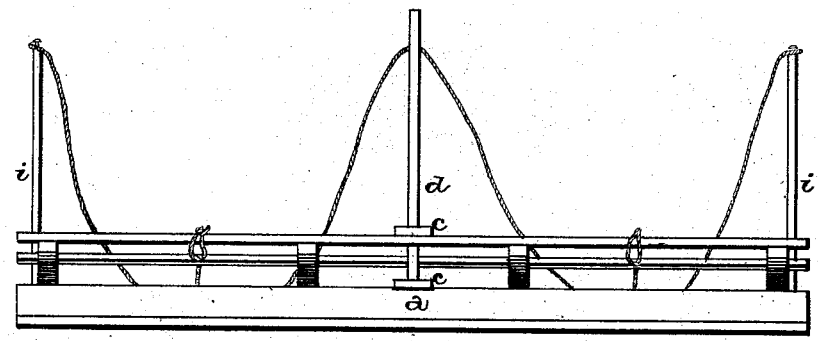
Figure 2:
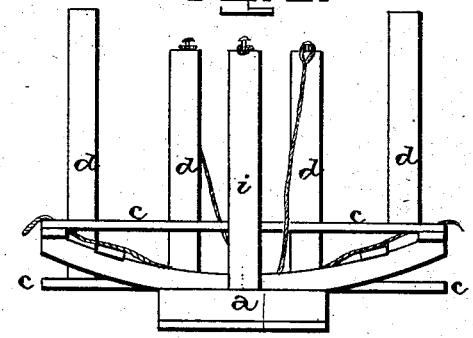

Figure 1 is a side elevation of my invention. Fig. 2 is an end view of the same.

*a* represents a hay-rack such as is in common use for hauling hay and straw. This rack is divided across its center by means of the two cross-bars *c* and standards *d,* so as to divide the load into two separate and distinct parts. These standards *d* are placed sufficiently far apart on the rack to allow a person to pass freely in and out between them, and they thus serve not only to divide the load, but to help the man to build the load up squarely and securely. At each end of the rack there is also placed a standard, *i*, as shown. Upon the top of the end standards and two of the center standards are formed catches, projections, or tenons, over which the ends of the ropes which are to be used in tying up the load are made to catch. One end of the rope is hooked on one of the end standards, and the other end is hooked upon the end of one of the center standards, and then a second rope is laid across the bottom of the rack at right angles to the rope which is attached to the two standards, each of these ropes having loops upon their ends.

When the wagon is driven to the barn it is only necessary to connect the ends of these ropes with the hay-elevating devices, and one-half of the load can be elevated directly from the wagon into the hay-mow at one pull.

By means of the construction above described it is not only much easier to build the load of hay upon the rack, but after it is built it is not so apt to fall off while the wagon is upon uneven ground, and the load is divided so that the whole of it can be lifted into the mow at two pulls.

Having thus described my invention, I claim—

1. A hay-rack having the central standards projecting up across its center, so as to divide the load into two separate and distinct parts, substantially as shown.

2. The combination of a hay-rack divided at its center by the middle standards, and provided with a standard at each end, with the looped ropes for raising each part of the load from the rack, substantially as described.

In testimony that I claim the foregoing I have hereunto set my hand this 16th day of December, 1879.

WILLIAM P. LELAND.

Witnesses:
LEONIDAS G. WOOLLEY,
J. D. PARR.